Nov. 20, 1928.
H. T. WOOLSON
1,692,145
MEANS FOR BALANCING PNEUMATIC TIRES
Filed Jan. 21, 1926
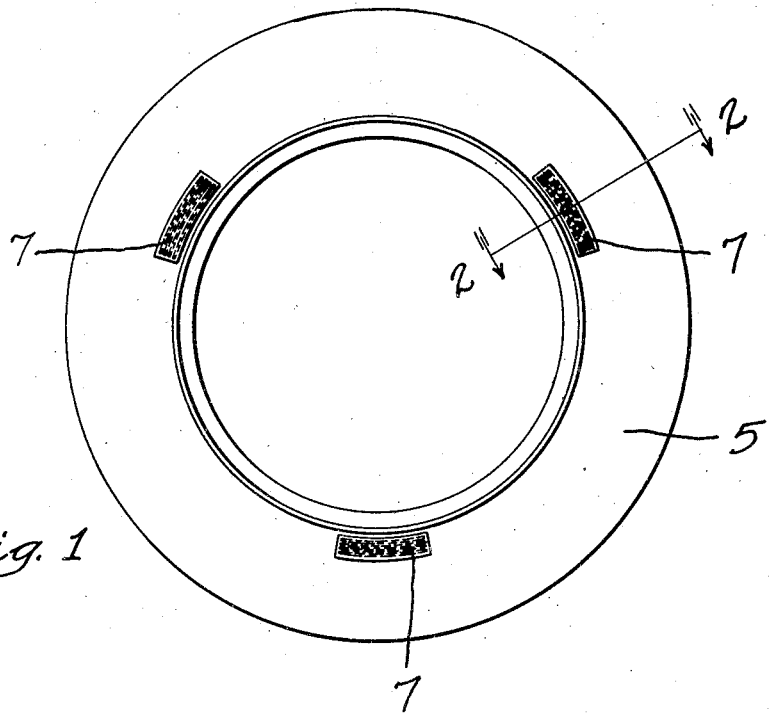
Fig. 1
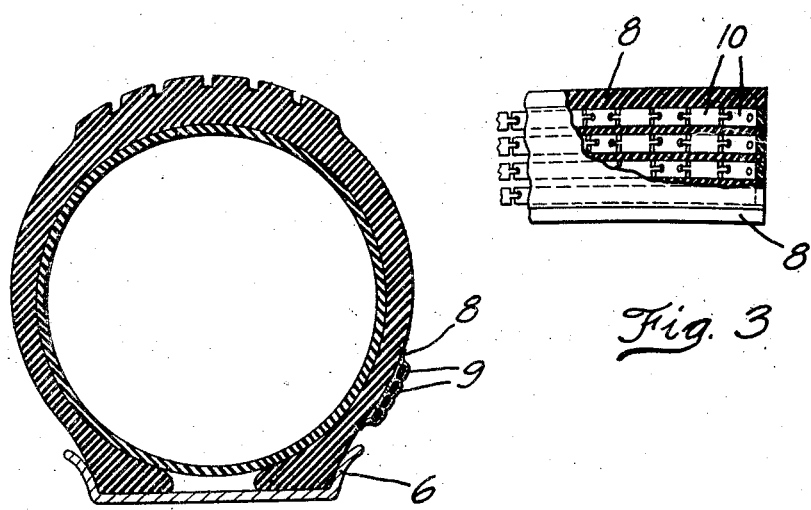
Fig. 2
Fig. 3
Inventor
HARRY T. WOOLSON
By *Hing Harness*
Attorney Patented Nov. 20, 1928.

1,692,145

UNITED STATES PATENT OFFICE.

HARRY T. WOOLSON, OF DETROIT, MICHIGAN, ASSIGNOR TO CHRYSLER CORPORATION, OF DETROIT, MICHIGAN, A CORPORATION OF DELAWARE.

MEANS FOR BALANCING PNEUMATIC TIRES.

Application filed January 21, 1926. Serial No. 82,861.

It has been customary, in the building of automobiles intended for high speed work, to balance or attempt to balance the wheels thereof so as to secure smooth operation at high speeds. This balancing has been done by the provision of counter weights in the wheels of the vehicle.

I have discovered that the unbalanced factors of an assembled wheel and tire are the result not only of inequalities of wheel balance and tire valve stem weight but of inequalities of balance in the tire casing itself. All of these inequalities can be cared for and the entire assembly balanced by the wheel counter weight construction heretofore practiced but when a tire casing has been removed from such a balanced assembly, it very seldom will be re-assembled to the wheel in exactly the same position as it originally occupied so that the inequalities of its balance will be manifested in the new assembly arrangement.

It is the primary object of my invention therefore to provide means for balancing a tire casing so that the assembly may not be thrown out of balance in any position at which the casing is placed on the wheel.

It is a further object of my invention to procure such an inherently balanced tire casing by securing thereto at regularly spaced intervals flexible weights which may bend with the tire casing and which may have portions added thereto or taken therefrom to secure a proper balance.

With the above and other objects in view my invention consists in the arrangement, combination and construction of the various parts of my improved device as described in the specification, claimed in my claims and shown in the accompanying drawings, in which:

Fig. 1 is an elevation of a tire casing embodying my invention.

Fig. 2 is a sectional view taken on line 2—2 of Fig. 1.

Fig. 3 is a detailed view partly in section and partly in elevation illustrating a counterweight used in my invention.

I have shown a conventional tire casing 5 of the "balloon" type adapted to be assembled upon a rim 6. It is impossible, in the commercial production of such tires to make them with accuracy to the point that they will be in balance throughout.

I dispose around one side of the casing 5 three evenly spaced weights indicated generally as 7. The weights 7 are formed by vulcanizing a patch-like member 8 to the side of the casing, which patch-like members are provided with perforations 9 through which a series of chains consisting of a plurality of articulated links 10 are threaded. The links 10 may be of any suitable material, such as lead, and a sufficient number of such links are distributed in the patch-like members 8 to properly balance the casing, after which the perforations 9 may be vulcanized around the links so as to definitely fix them with respect to the tire casing. Thus the tire casing becomes inherently balanced and will not effect the wheel balance at any position in which it may be assembled to the wheel structure.

I desire it to be understood that as many patch-like members 8 to form counter-weight portions 7 may be utilized around the casing as is found desirable. I also desire it to be understood that other counterweighting means than links may be utilized although I have found it preferable to use some such arrangement because of the ease with which weight can be added or taken from the counterweighted portions and for the further reason that the links will flex with the casing in normal usage.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. A tire casing having articulated weights secured thereto inherently balancing it radially.

2. A tire casing having a plurality of linked weights secured thereto balancing it radially.

3. A tire casing having a plurality of patch-like members secured thereto, apertures in said members and weights secured in said apertures.

4. A tire casing having a plurality of patch-like members secured thereto, apertures in said members and articulated weights secured in said apertures.

5. A pneumatic tire casing having patch like members secured to the outer surface thereof balancing it radially.

6. A flexible tire casing having flexible weights attached thereto inherently balancing the casing radially.

HARRY T. WOOLSON.